United States Patent
Asrar et al.

(10) Patent No.: US 7,208,535 B2
(45) Date of Patent: Apr. 24, 2007

(54) PHA COMPOSITIONS AND METHODS FOR THEIR USE IN THE PRODUCTION OF PHA FILMS

(75) Inventors: Jawed Asrar, Chesterfield, MO (US); Jean R. Pierre, St-Denis (BE)

(73) Assignee: Metabolix, Inc., Cambridge, MA (US)

( * ) Notice: Subject to any disclaimer, the term of this patent is extended or adjusted under 35 U.S.C. 154(b) by 272 days.

(21) Appl. No.: 10/635,316

(22) Filed: Aug. 6, 2003

(65) Prior Publication Data

US 2004/0039092 A1     Feb. 26, 2004

Related U.S. Application Data

(63) Continuation of application No. 09/845,578, filed on Apr. 30, 2001, now Pat. No. 6,620,869, which is a continuation of application No. 09/122,147, filed on Jul. 24, 1998, now abandoned.

(60) Provisional application No. 60/053,720, filed on Jul. 25, 1997.

(51) Int. Cl.
 C08L 67/04   (2006.01)
 C08K 5/5313  (2006.01)

(52) U.S. Cl. .................. 524/135; 524/133; 524/311; 524/399; 524/404; 524/432

(58) Field of Classification Search ............. 524/133, 524/135, 311, 399, 404, 432
See application file for complete search history.

(56) References Cited

U.S. PATENT DOCUMENTS

| | | | |
|---|---|---|---|
| 3,400,150 A | 9/1968 | Whyte et al. | |
| 4,826,493 A | 5/1989 | Martini et al. | |
| 4,880,592 A | 11/1989 | Martini et al. | |
| 5,061,743 A | 10/1991 | Herring et al. | |
| 5,076,983 A | 12/1991 | Loomis et al. | |
| 5,138,029 A | 8/1992 | Nishioka et al. | |
| 5,191,016 A | 3/1993 | Yalpani | |
| 5,217,803 A * | 6/1993 | McBride et al. | 428/323 |
| 5,231,148 A | 7/1993 | Kleinke et al. | |
| 5,258,422 A | 11/1993 | Chang et al. | |
| 5,300,576 A * | 4/1994 | Nemphos et al. | 525/190 |
| 5,382,652 A | 1/1995 | Fukada et al. | |
| 5,458,836 A | 10/1995 | Rakestraw et al. | |
| 5,502,158 A | 3/1996 | Sinclair et al. | |
| 5,502,273 A | 3/1996 | Bright et al. | |
| 5,534,616 A | 7/1996 | Waddington | |
| 5,574,129 A | 11/1996 | Miyoshi et al. | |
| 5,599,891 A | 2/1997 | Horowitz et al. | |
| 5,618,855 A | 4/1997 | Noda | |
| 5,711,842 A | 1/1998 | Kemmish | |
| 5,753,782 A | 5/1998 | Hammond et al. | |
| 6,127,512 A * | 10/2000 | Asrar et al. | 528/272 |
| 6,620,869 B2 * | 9/2003 | Asrar et al. | 524/133 |

FOREIGN PATENT DOCUMENTS

| | | |
|---|---|---|
| CA | 2161059 | 10/1995 |
| EP | 0 400 855 | 12/1990 |
| EP | 0 736 563 | 10/1996 |
| JP | 9-132701 | 5/1997 |
| WO | WO 92/04412 | 3/1992 |
| WO | WO 94/06856 | 3/1994 |
| WO | WO 94/28061 | 12/1994 |

* cited by examiner

Primary Examiner—Peter Szekely
(74) Attorney, Agent, or Firm—Pabst Patent Group LLP

(57) ABSTRACT

PHA pellet compositions are provided which are processible into blown and cast free-standing films. The Mw of the PHA in the pellets used to produce the films is at least 470,000, at least 435,000 if PHA thermal stabilizers of the invention are used. In order to achieve a stable, unsupported film having desirable elongational and tensile properties, the Mw of PHA in the film is greater than about 420,000.

30 Claims, No Drawings

PHA COMPOSITIONS AND METHODS FOR THEIR USE IN THE PRODUCTION OF PHA FILMS

This application is based on U.S. Provisional Application No. 60/053,720, filed Jul. 25, 1997.

FIELD OF THE INVENTION

The present invention relates generally to the field of biodegradable polymers. More particularly, it concerns polyhydroxyalkanoate (PHA) pellet compositions and methods for their use in the production of PHA films and shaped objects.

BACKGROUND OF THE INVENTION

There has been considerable interest in recent years in the use of biodegradable polymers to address concerns over plastic waste accumulation. The potential worldwide market for biodegradable polymers is enormous (>10 B lbs/yr). Some of the markets and applications most amenable to the use of such biopolymers involve those having single, short use applications, including packaging, personal hygiene, garbage bags, and others. These applications, although poorly suited for recycling, are ideally suited for biodegradation through composting.

PHA biopolymers are polyesters produced by numerous microorganisms in response to nutrient limitation. The commercial potential for PHA spans many industries, and is derived primarily from certain advantageous properties which distinguish PHA polymers from petrochemical-derived polymers and other polymers derived from renewable resources, namely excellent biodegradability and/or natural renewability compared to the petrochemical-derived polymers, and hydrophobicity compared to other polymers derived from renewable resources.

Widespread use and acceptance of PHA, however, has been somewhat hindered by certain undesirable chemical and physical properties of these polymers. For example, PHA is one of the most thermosensitive of all commercially available polymers. As such, a dramatic rate of polymer degradation is observed at the temperatures typically required for conventional processing of PHA into end-products such as films, coatings, fibers etc. An additional limitation of the potential utility of PHA polymers relates to the observation that certain characteristics such as ductility, flexibility and elongation of the polymer diminish over time. This rapid "aging" of certain PHA-derived products is unacceptable for many applications in that the products fail to maintain adequate structural integrity for their intended useful life. Thus, the success of PHA as a viable alternative to both petrochemical-derived polymers and to non-PHA biodegradable polymers, will depend upon novel approaches to overcome the unique difficulties associated with PHA polymer processing and with products derived therefrom.

One important application of biodegradable polymers is in the area of films. Films with properties suitable for diverse applications, however, have been difficult to prepare using PHA polymers due to their frequently unacceptable mechanical characteristics, for example poor melt strength, rapid aging, and brittleness.

GB 2,243,327 teaches that biodegradable PHA polymers, such as polyhydroxybutyrate-co-valerate (PHBV) copolymer, cannot be formed into thin films while maintaining the required strength and tear resistance for applications such as a diaper backsheet. This problem was addressed by combining a thin biodegradable thermoplastic polymer film into a sheet laminate with at least one layer of a fiber substrate comprised of biodegradable fibers. However, a cast film of PHBV (6.5% HV) 20–24 microns thick when laminated with a rayon nonwoven showed elongation at break of less than 10% in the machine direction which was less than that for the rayon portion alone.

U.S. Pat. No. 4,880,592 discloses a means of achieving a free-standing PHBV film for diaper backsheet applications by coextruding the PHBV between two layers of sacrificial polymer, for example polyolefins, stretching and orienting the multilayer film, and then stripping away the polyolefin layers after the PHBV has had time to crystallize. The PHBV film is then laminated to either water soluble films or water insoluble films such as PVDC or other polyolefins.

WO 94/00293 discloses multilayer films wherein the PHBV component may be coextruded as an internal layer surrounded by outer layers of films (e.g. biodegradable films) to be used in the application (e.g. diaper films) so that the external layers are not stripped away from the PHBV layer. They remain as an integral part of a biodegradable multilayer film.

EP 736,563 describes a process for producing cast and blown films from PHBV copolymers that have been compounded with plasticizers, nucleating agents and/or other additives. No specifications of the copolymer were disclosed other than an HV content of 4–16%. The molecular weights of the PHBV powder used in the examples ranged up to 520,000 before compounding and extrusion into pellets. In their disclosed process, films of the compounded PHBV were extruded on a preformed supportive bubble of EVA-resin or LDPE with MFI less than 2.5 g/10 min.

Thus, attempts to use PHA in the production of films have generally resulted in unacceptable elongational properties for use in a continuous process and/or a requirement for the presence of one or more non-PHA polymer layers in order to improve film processibility and/or properties. It is desired, therefore, to have a method to produce PHA films by a continuous process that have improved overall mechanical characteristics as required for the numerous applications in which films are typically employed. Furthermore, it is desired that the means to produce improved PHA films be a simple and rapid process that is easily amenable to large scale production, where the PHA films do not require the presence of non-PHA polymeric materials to achieve acceptable processing performance and/or product properties.

SUMMARY OF THE INVENTION

In accordance with one aspect of the present invention, there are provided pellet compositions comprising PHA, wherein the Mw of the PHA in the pellets is greater than about 470,000. The pellets are produced by melting PHA powder having a Mw greater than about 500,000, extruding a strand of the melted PHA, cooling and crystallizing the extruded strand and cutting the strands into pellets. The pellets so produced are suitable for use in the production of numerous PHA end products by extrusion, molding, coating, spinning and calendaring operations, in particular extrusion blow molded and stretch blow molded containers and bottles, calendered and thermoformed sheets and general extruded parts. The pellet compositions are particularly useful in the production of blown and cast free-standing films as described herein.

In accordance with another aspect of the present invention, there are provided blown and cast free-standing films comprising PHA which are producible by a continuous process. In order to achieve a stable film process, the Mw of the PHA in the film is preferably greater than about 420,000. Such films are produced by melting PHA, preferably in the form of the pellet compositions of the present invention, and forming the melt into a film. The films so produced have desirable melt and extensional strength characteristics. For example, they have stretch ratios between about 2 and 7, elongation to break greater than 65%, preferably greater than 75%, and tensile strength at break greater than 50 Mpa, preferably greater than 75 Mpa.

In accordance with another aspect of the present invention, there are provided PHA thermal stabilizers capable of inhibiting the degradation of PHA during exposure to temperatures or conditions which cause PHA degradation. The thermal stabilizers comprise compounds having the following general structure:

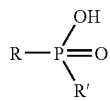

where R' is R or OH, and R is a branched or unbranched saturated $C_1$–$C_{30}$ group, a branched or unbranched unsaturated $C_2$–$C_{30}$ group, a $C_6$–$C_{30}$ aromatic group, or a saturated or unsaturated $C_6$–$C_{30}$ cycloaliphatic group. The compounds may contain one or more O, N or S atoms in the alkyl chains and may optionally be substituted with one or more groups selected from but not limited to hydroxyl, halo, carboxylic acid or ester, cyano, aryl, amino, hydroxylamino, mono-, di-, or trialkyl amino, phosphonic acid, etc.

Examples of suitable thermal stabilizers of this class of phosphorous-containing compounds include cyclohexylphosphonic acid, 1-cyclohexenylphosphonic acid, 1-hydroxycyclohexenylphosphonic acid, 1-hexanephosphonic acid, 1-hydroxyethylidene 1,1-diphosphonic acid, or dicyclohexylphosponic acid, 2,4,4-(trimethylpentyl)cyclohexylphosphonic acid.

The thermal stabilizer can also comprise oxides, hydroxides, or carboxylic acid salts of a metals from Groups I to V of the Periodic Table. For example, calcium stearate, barium stearate, magnesium stearate, barium stearate, zinc stearate, and zinc oxide are particularly suitable for use as PHA thermal stabilizers according to the present invention. The thermal stabilizer may comprise one of the disclosed compounds or may comprise a mixture thereof.

When thermal stabilizers of the present invention are used, less PHA Mw loss is observed when compounding PHA powder into PHA pellets, and when processing PHA pellets into PHA films. As such, pellet compositions suitable for producing the PHA films of the present invention can have a PHA Mw as low as about 435,000, while still maintaining the ability to produce film having the desired Mw of greater than about 420,000. Similarly, if a thermal stabilizer is present when producing the 435,000 Mw PHA pellets from PHA powder, the Mw of the PHA powder can be as low as about 480,000.

DESCRIPTION OF ILLUSTRATIVE EMBODIMENTS

PHAs are biodegradable polymers or copolymers having the following general structure for one or more of the repeating units:

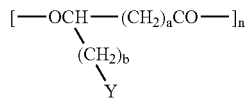

where a is 0 to 6, b is 0 to 15, Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc., and n is an integer. The pendant groups of the repeating units may contain additional functionalization such as double bonds, epoxidized double bonds, hydroxyl groups, alkyl groups, alkenyl groups etc. or combinations thereof. The polymer main chain can contain up to 8 carbons in the repeating units and there may be additional functionalization in or on the main chain such as double bonds, alkyl groups, alkenyl groups, hydroxyl groups etc. or combinations thereof.

The PHA is preferably one capable of being biologically produced, for example in a plant or microbial organism. Most typically, it is a fermentation product, particularly of a microbiological process, whereby a microorganism lays down polyhydroxyalkanoate during normal or manipulated growth. Manipulation may be achieved by removing or failing to produce one or more nutrients necessary for cell multiplication. Numerous microbiological species are known in the art to be suitable for the production of polyhydroxyalkanoate polymers (see for example, Anderson and Dawes, Micro. Rev. 54 (4): 450–472, 1990). The microorganisms may be wild type or mutated or may have the necessary genetic material introduced into it, for example by any of the methods or recombinant DNA technology. It is to be emphasized that it is not necessary for the PHA-producing organism to be a microorganism, but at present such organisms are preferred.

The PHAs preferably have as constituents hydroxyalkanoates (HA) monomers which are substrates for PHA synthase enzymes. Biologically-produced PHA polymers are the product of PHA synthase microbial enzymes, and are produced in either a bacterial cell which naturally contains a PHA synthase, or in a bacterial or other cell type, for example a plant cell, which has been genetically engineered to express such an enzyme. The microbial PHA synthase enzymes have broad substrate ranges and are capable of incorporating a large number of HA monomers as constituents of biosynthetic PHA depending upon growth conditions, precursor substrate availability, and the source of the PHA synthase enzyme. The diversity in composition of biosynthetic PHA polymers is underscored by the fact that at least 91 HA monomers have been identified as substrates for PHA synthases (Steinbuchel, A. and Valentin, H. FEMS Micro. Letters 128 (1995) 219–228).

Suitable HA monomers can include those having the following formula:

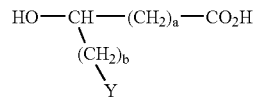

where a is 0 to 6, b is 0 to 15 and Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc. As in the above description, there may be additional functionalization in or on the pendant and/or main chains. The monomers can be homopolymerized or copolymerized either biochemically or synthetically to produce the polymer.

Preferred HA monomers include those where a=1–4, b=0–15, and Y is H. More preferably, the monomers are those where a=1–2 and b=0–3, and Y is H. For example In a most preferred polymer, the PHA is of formula (I) where a is 1, b is 1 or 2 and Y is H and especially where there are units with b=1 and b=2 copolymerized together. Suitable polyesters contain a preponderance of b=1, especially with at least 70 mol % of such units, the balance being units in which b=2. Polymer containing a=1, b=1, Y=H as the only units is polyhydroxybutyrate (PHB) polyester while that containing additionally b=2 is polyhydroxy-butyrate-co-valerate (PHBV).

The polymer can also be a blend of two or more PHAs differing in the value of m. A particular example contains:
a) polymer consisting essentially of Formula I units in which 2–5 mol % of units have a=1, b=2 and Y=H, the rest a=1, b=1, and Y=H, and
b) polymer consisting essentially of Formula I units in which 5–30 mol % of units have a=1, b=2 and Y=H, the rest a=1, b=1, and Y=H.

The proportions of the polymer in such a blend is preferably such as to give an average a=1, b=2 and Y=H content in the range 2 to 28 mol % and typically 4 to 18 mol %. Thus, in a most preferred form the polymer is a poly (hydroxybutyrate/valerate) copolymer or blend of copolymers.

As used herein, the term "molecular weight", unless otherwise specified, refers to the weight average molecular weight (Mw) as opposed to the number average molecular weight (Mn). Most synthetic polymers have a broad distribution of molecular weights, and the molecular weights reported for such polymers represent averages, most frequently defined by Mw or Mn according to the following formulas:

$$M_w = \sum_i n_i M_i^2 \bigg/ \sum_i n_i M_i$$

$$M_n = \sum_i n_i M_i \bigg/ \sum_i n_i$$

where $n_i$=the number of molecules of molecular weight $M_i$. The most commonly used technique for determining Mw and Mn is by gel permeation chromatography (GPC). This method is capable of determining the entire molecular weight distribution of a polymer sample from which molecular weight averages can be determined. Other methods known in the art for determining Mw and Mn include osmometry, scattering and sedimentation (See for example, W. R. Sorensen & T. W. Campbell: Preparative Methods of Polymer Chemistry, Interscience Publishers, NY, 1961).

PHA Pellets

For most processes that produce thermoplastic polymer products such as films and molded articles, it is desirable to have a polymer, polymer blend or polymer formulation supplied to the processor in the form of pellets. This allows the polymeric material to be provided to the processor preformulated for a particular application. In addition, the use of pellets are advantageous in that they avoid problems with dust typically encountered when handling powders. Generally, such pellets are prepared by melt extruding continuous strands of a polymer, polymer blend or the polymer formulation and then cutting the strands into pellets of a desired length.

In one embodiment of the present invention, there are provided pellet compositions comprising PHA. It has been found that pellets containing PHA of molecular weights greater than about 470,000 are extremely useful in the production of PHA films having desirable characteristics not previously observed. For example, due to the low melt strength of PHA, blown PHA films have not been successfully produced without employing the use of a supporting film. The pellet compositions of this invention allow for the production of blown and cast free-standing PHA films having excellent properties while not requiring use of a supporting film. The PHA pellet compositions have a desirably low melt flow index (MFI) less than about 20, preferably less than about 14, and more preferably less than about 8 g/10 min (170° C./5 kg load).

In addition to their utility in producing PHA films as further described herein, such pellets are also useful in the production of other PHA end products by extrusion, molding, coating, spinning and calendaring operations, in particular extrusion blow molded and stretch blow molded containers and bottles, calendered and thermoformed sheets, general extruded parts, solution and melt spun fibers and foamed materials and products.

In a further embodiment of the present invention, there is provided a method of making the PHA pellet compositions. PHA pellets having high molecular weights have been difficult to produce due to the thermosensitivity of PHA at the processing conditions typically used in the art for pellet production. It is well known in the art that high temperatures produce very rapid PHA degradation. (See for example, Grassie, N., Murray, E. J. and Holmes, P. A. -Polym. Degrad. Stab. 6, pp. 47,95,127 (1984)). The processing conditions disclosed herein serve to minimize the thermal degradation of PHA during processing into pellets. Factors which can effect such degradation include the temperature at which extrusion is performed, the time of exposure to such temperatures, screw speed, shear heating, and screw and dye design.

The pellets of this invention are generally produced by extrusion of PHA powder under conditions of low shear and temperature control, either in a single or twin screw extruder. For example, the pellets can be produced using a single screw extruder with a short barrel length (L/D=20) and a low to medium screw speed while maintaining the melt temperature below about 170° C., cooling and crystallizing an extruded strand into a long water bath maintained at 55 to 60° C., and cutting the strand into pellets. The present method allows for the production of high molecular weight PHA pellets without excessively compromising the stability of the polymer in response to the conditions required for their production.

It was unexpected that only when PHA in the pellets was of a Mw greater than about 470,000 would the pellets be processible into self-supporting blown films. The molecular weight of the PHA in the pellet compositions is determined in part by the molecular weight of the PHA powder used as the starting material to make the pellets. Thus, when making the pellets of the present invention, it is necessary to choose a suitable molecular weight of the PHA powder and to utilize appropriate processing conditions in order to arrive at pellets having the desired Mw greater than about 470,000. Under the processing conditions disclosed above and in the Examples which follow, it is typical to observe about 10 to 30% reduction in molecular weight of the PHA in the pellets compared to the molecular weight of the PHA in the powder used to produce them. Thus, the PHA in the powder used to produce the PHA-containing pellets of the present invention typically has a Mw greater than about 500,000.

The PHA pellets of the present invention preferably contain a plasticizer. Suitable plasticizers for use in the PHA pellet compositions include those known in the art to be useful in combination with PHA, such as acetyl tri-alkylcitrates, triacetin, phthalate esters and others (see for example WO 94/28061).

Nucleants are also typically used in producing the PHA pellets of the present invention. Suitable nucleants can be selected from those known in the art, for example particulate nucleants such as saccharin, talc, boron nitride, ammonium chloride, PHB seed crystals, "polymer soluble" nucleants such as organic phosphonic acids and their combinations with stearic acid salts (see for example WO 91/19759).

A preferred nucleant is one having the following structure:

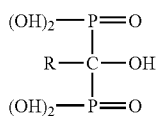

where R can be hydroxy, hydrogen, C1–C25 alkyl groups (with or without one or more substituent groups such as —OH, —CO2H, —Cl, —Br, —NH2, —N(alkyl)H or N(alkyl)2), cycloalkyl groups, aryl or arylalkyl groups (such as phenyl, benzyl, etc. with or without substituents on the aromatic rings). Synthesis of such compounds can be achieved, for example, by reaction of organocarboxylic acids, PC13 in an aqueous medium. The compounds and their syntheses have been described in the prior art for use as water treating chemicals, detergent ingredients, etc. (for example see U.S. Pat No. 3,855,284, U.S. Pat. No. 3,400,147, U.S. Pat. No. 3,400,150, U.S. Pat. No. 4,254,063, Aus. 599,950, FR 1,521,961 and CA 93:182031). The synthesis can also be applied to dibasic acids such as adipic acid, succinic acid, etc. to give the corresponding tetrakis phosphonic acid (i.e., di-ODPAs) which can also be used as nucleants. For example, with adipic acid, 1,6-dihydroxy-1,6-dihexanediylidene tetraphosphonic acid is obtained (Aus. 599950). Other compounds that can be used as nucleants include methylene diphosphonic acid (PL 131549) and carbonyl diphosphonic acid (CA 93:182031). Such compounds are herein sometimes referred to as organodiphosphonic acids or ODPAs, which is term intended to include both ODPAs and di-ODPAs. The ODPA or di-ODPA may also be formed in situ, for example by reaction of the corresponding phosphinic acid.

Preferred ODPAs include 1-hydroxy-lower alkylidene-1,1-diphosphonic acids such as 1-hydroxyethylidene-1,1-diphosphonic acid (HEDP), 1-hydroxypropylidene-1,1-diphosphonic acid, 1-hydroxybutylidene-1,1-phosphonic acid, 1-hydroxycyclohexylidene-1,1-diphosphonic acid. In a most preferred nucleant, both acid moieties are phosphonic acid moieties, RI is a methyl group and R2 is hydroxy group (i.e., HEDP). HEDP is available as a mixture of HEDP in water from Monsanto Company (800 N. Lindbergh, St. Louis, Mo. 63167) under the tradename DEQUEST 2010.

The ODPA is used in amounts typically in the range of 0.01–5.0 phr (parts per hundred resin), more preferably about 0.02–1.0 phr, most preferably 0.02–0.5 phr.

The nucleants can further be metallic salts of ODPAs, preferably mono-metallic salts. However, it is generally preferred that not all, e.g., less than 70%, more preferably less than 60% of the phosphonic acid moieties are involved in the salt formation since it has been found that excessive salt formation may adversely influence the effectiveness of certain nucleants of the invention.

Organic metal salts and/or certain inorganic compounds can be used to further improve nucleation activity and/or reduce the extent of discoloration and/or improve the clarity of PHA-derived products when used in combination with the ODPAs of the invention. The organic metal salt is preferably an organic acid salt, more preferably a fatty acid metal salt. The inorganic compound is preferably an metal oxide, a metal hydroxide or a metal carbonate. Suitable metals include those selected from Groups I to V of the periodic table, preferably aluminum, antimony, tin, sodium, calcium, magnesium, barium or zinc. Most preferably the metal is one which has benign environmental and toxicological properties such as magnesium, calcium and barium. Preferred fatty acids include stearic acid, palmitic acid, acetic acid, propionic acid, caproic acid, oleic acid, behenic acid and montanic acid. Most preferably, the fatty acid metal salt of the invention is calcium stearate or magnesium stearate which have proven highly effective in combination with ODPAs in nucleating thermoplastic polyesters. The organic metal salt or the inorganic metal oxide, metal hydroxide or metal carbonate is used in an amount typically ranging from 0.001 to 5 phr (parts per hundred of resin), preferably about 0.005 to 2 phr, and most preferably about 0.01 to 0.5 phr.

A nucleant formulation preferably comprises organic metal salt (or inorganic metal oxide, metal hydroxide or metal carbonate) and ODPA in weight ratios of about 0.01:1 to 10:1, preferably about 0.05:1 to 7.5:1, and more preferably about 0.1:1 to 5:1. When calcium stearate is used in a preferred nucleant formulation, a 3:1 ratio has been found to provide a suitable solid support for the ODPA-solvent solution and to produce a PRA nucleant with desirable activity.

The weak organic base is one which is effective in improving the elongational properties and/or clarity of the polymeric material. The weak organic base should be polymer-miscible or -soluble and melt at a sufficiently high temperature so that, if desired, nucleating agent solvent can be readily removed during preparation. The weak organic base preferably comprises a mono-, bis-, or tri-fatty acid amide, as these generally exhibit good hydrolytic stability in the presence of ODPAs. More preferably, the weak organic base is a stearamide, for example ethylene bistearamide (EBS), available from Lonza or Henkel under the tradename Acrawax C or Loxamid EBS. The weak organic base is typically present in the polymeric compositions in an amount between about 0.01 to 9.0 phr, preferably between about 0.05 to 1.0 phr, most preferably about 0.1 to 0.5 phr.

Thus, a most preferred nucleant for use in this invention comprises HEDP/calcium stearate/EBS present in ratios effective for nucleating PHA and producing PHA articles having excellent clarity, color, elongational and tensile properties. Most preferably, the constituents of this formulation are present in weight ratios of about 0.8/1.5/1.7 respectively.

Suitable levels of such a nucleant formulation to be added to the PHA range from about 0.01 to 5.0 parts per hundred of resin (phr). Preferably, the level of the nucleant formulation is about 0.05–1.0 phr, and most preferably it is about 0.1–0.6 phr.

It is advantageous when preparing the nucleant to dissolve/suspend the ODPA, and optionally the organic metal salt, inorganic metal oxide, metal hydroxide or metal carbonate, and/or the weak organic base, in an effective nucleating agent solvent. Preferably, the solvent is then removed, for example by evaporation under vacuum, giving rise to solids which are ground, pulverized, or otherwise treated so as to produce particles with diameters less than about 710 microns, preferably less than about 350 microns. The term "effective nucleating agent solvent" herein means a solvent which dissolves the ODPA and preferably enhances its nucleation activity but which does not intolerably reduce its effectiveness as a nucleant. Thus, the ODPA prepared using an effective nucleating agent solvent as described herein will have at least as effective nucleation activity, preferably greater nucleation activity, compared to the same ODPA that is not dissolved in an effective nucleating agent solvent during its preparation or use.

Nucleating agent solvents for use in this invention include but are not limited to C1 to C6 aliphatic mono, di- and tri-ols such as methanol, ethanol, ethylene glycol, 1- or 2-propanol, propylene glycol, glycerol, 2-methyl-2-propanol, 2-butanol and the like, and further including mixtures of such solvents with each other and with water. Preferred nucleating agent solvents include methanol, ethanol or another lower alcohols, or mixtures of such alcohols with water to allow for easy solvent removal. The nucleating agent solvent needs to be appropriately selected since it has been found that some solvents such as acetone and tetrahydrofuran when used with some ODPAs such as HEDP are not effective nucleating agent solvents. However, it is known that mixtures of solvents, e.g. methanol and acetone, can serve as effective nucleating agent solvents as defined herein even though one of the solvents in the mixture is not an effective nucleating agent solvent when used alone. While all of the solvents which will be effective nucleating agent solvents has not yet been elucidated, a person skilled in the art can readily determine whether a proposed solvent for an ODPA is "effective" by routine experimentation following the description herein.

It would be understood by one skilled in the art that the PHA pellet compositions of the present invention may include a number of additives or other components which are commonly included in polymeric materials without departing from the spirit and scope of the present invention. These may include, for example, dyes, fillers, stabilizers, modifiers, anti-blocking additives, antistatic agents etc.

PHA Thermal Stabilization

In another embodiment of the present invention, there is provided a means for further minimizing the thermal degradation of PHA. It has been found that the presence of certain compounds, hereinafter referred to as thermal stabilizers, can reduce the extent of molecular weight loss due to PHA degradation normally observed during compounding of PHA powder into PHA pellets, and during processing of PHA pellets into end products such as films. Given the extreme thermosensitivity of PHA, the present method is applicable to any situation where it is desirable to minimize PHA degradation during exposure to temperatures or other conditions which would typically cause such degradation.

Thermal degradation of PHA is generally believed to take place by chain scission involving the formation of a six-membered transition state. Unlike most polymers, where thermal degradation is a free radical process, it has been reported and generally accepted that free radical scavengers and known thermal stabilizers have not been effective in stabilizing PHA against thermal degradation.

One class of thermal stabilizers of the present invention comprise compounds having the following structural formula:

where R' is R or OH, and R is a branched or unbranched saturated $C_1$–$C_{30}$ group, a branched or unbranched unsaturated $C_2$–$C_{30}$ group, a $C_6$–$C_{30}$ aromatic group, or a saturated or unsaturated $C_6$–$C_{30}$ cycloaliphatic group. The compounds may contain one or more O, N or S atoms in the alkyl chains and may optionally be substituted with one or more groups selected from but not limited to hydroxyl, halo, carboxylic acid or ester, cyano, aryl, amino, hydroxylamino, mono-, di-, or trialkyl amino, phosphonic acid, etc.

Examples of suitable thermal stabilizers of this class of phosphorous-containing compounds include cyclohexylphosphonic acid (DZB), 1-cyclohexenylphosphonic acid, 1-hydroxycyclohexenylphosphonic acid, 1-hexanephosphonic acid, 1-hydroxyethylidene 1,1-diphosphonic acid, or dicyclohexylphosponic acid, 2,4,4-(trimethylpentyl)cyclohexylphosphonic acid. Particularly useful are cyclohexylphosphonic acid and 1-hydroxyethylidene-1,1-diphosphonic acid acid.

The present findings suggest that, although random chain scission is likely the main mode of thermally induced PHA degradation, other processes such as thermo-oxidative degradation may also be operative in reducing the Mw of PHA during thermal processing since phosphorous-containing compounds can act as oxygen scavengers.

Various metal containing compounds can also serve as PHA thermal stabilizers. Metal compounds suitable for use in the present invention include oxides, hydroxides, and saturated or unsaturated carboxylic acid salts of metals from Groups I to V of the Periodic Table. These can include, for example, compounds of aluminum, antimony, barium, tin, sodium, calcium, magnesium and zinc. The carboxylic acids can include stearates and palmitates. Particularly useful are fatty acid salts such as calcium stearate (CaSt), magnesium stearate (MgSt), zinc stearate (ZnSt), and zinc oxide. While not wishing to be bound by this explanation, it is possible that the ability of such compounds to act as thermal stabilizers may be due to their lubricating effects. This may result in reduced shear heating generated during processing, thereby resulting in less internal polymer heat and therefore less degradation.

A single thermal stabilizer may be used in an amount sufficient to inhibit PHA degradation. Alternatively, a combination of thermal stabilizers can be used. In one preferred embodiment, both DZB and zinc stearate are dry blended with the PHA powder used to produce PHA pellets. Although a DZB/ZnSt combination has been used as a nucleant system in some settings (see for example WO 91/19759) the ability of such compounds to act as thermal stabilizers for PHA has not been previously recognized. This invention demonstrates that the presence of DZB and ZnSt results in significantly less PHA degradation during the pellet forming process. As a result, PHA pellets extruded with DZB and ZnSt show significantly less molecular weight loss relative to the PHA powder used to produce them than PHA pellets extruded with the commonly used nucleant, boron nitride. Furthermore, when these pellets are melt processed into films, significantly less Mw reduction during film production is observed, as further described below.

Film Production

In a further embodiment of the present invention, there are provided PHA film compositions. Extruded PHAs having molecular weights greater than about 420,000 provide a novel and desirable combination of melt strength during initial film formation and subsequent drawability sufficient for use in stable blown film and cast film processes.

The differences in properties for films containing PHA having molecular weights less than about 420,000, compared to films containing PHA of higher molecular weights was unexpected. It was further unexpected that even higher molecular weight PHA films (i.e. greater than 420,000) could be produced without encountering processing difficulties due to unacceptably high viscosities. Polymer melt having desired melt and extensional strengths, while maintaining good processability, were only achieved when the molecular weight of the PHA in the extruded film was greater than about 420,000.

The PHA film compositions of the present invention are preferably oriented, either mono- or bi-axially, in order to maximize mechanical properties. Bi-axially oriented means to stretch the film along a direction in which it travels, called the machine direction, and in a direction 90° to the machine direction in the plane of the film, known as the transverse direction, thereby extending length and width of the film to greater than its initial dimensions. Bi-axial orientation may involve simultaneous or sequential stretching. Mono-axial orientation refers to stretching in either the machine direction or the transverse direction, but not both. PHA film compositions of the present invention are formed into films of a uniform thickness ranging from about 75 to 150 microns prior to orientation, and ranging from about 5 to 100 microns after orientation.

Films of the present invention typically exhibit elongation to break greater than 65%, preferably greater than 75%, and more preferably greater than 100%. In addition, the tensile strength of the films is typically greater than 50 Mpa, preferably greater than 75 Mpa, and more preferably greater than 90 Mpa.

The PHA films preferably contain a plasticizer. Suitable plasticizers for use in the PHA film compositions of the present invention include those known in the art, such as acetyl tri-alkylcitrates, triacetin, phthalate esters and others (see for example WO 94/28061). The presence of plasticizer can influence the drawability of the film and contribute to the ability to achieve film production in a continuous process. Suitable plasticizer amounts may vary depending upon the particular plasticizer used. Generally, the plasticizer is present in the extruded PHA in the range of 5 to 20 phr, preferably about 10 to 15 phr.

Nucleants are also typically used in the PHA films of this invention. Suitable nucleants can be selected from those known in the art, for example particulate nucleants such as talc, boron nitride, ammonium chloride, PHB seed crystals or "polymer soluble" nucleants such as organic phosphonic acids and their combinations with stearic acid salts. Preferably, the nucleant is an organophosphorous compound having at least two phosphonic acid moieties, optionally in combination with an organic metal salt and/or weak organic base, as described above.

In a further embodiment, there is provided a method of significantly reducing PHA molecular weight loss during film processing by providing one or more thermal stabilizers of the present invention. For example, the presence of DZB and ZnSt in the pellets used to produce the films of the present invention resulted in only a 3% PHA Mw loss during film processing compared to 14.1% when boron nitride was used as a nucleant (see Example 21). Thus, when thermal stabilizers are present in the pelletized PHA, the molecular weight of the PHA in the pellet can be as low as about 435,000 while still allowing for the production of blown film containing PHA of the desired molecular weight greater than about 420,000.

It would be understood by one skilled in the art that the PHA film compositions of the present invention may include a number of additives or other components which are commonly included in polymeric films without departing from the spirit and scope of the present invention. These may include, for example, dyes, fillers, stabilizers, modifiers, anti-blocking additives, antistatic agents etc.

The PHA film compositions of the present invention are useful for numerous applications involving packaging, bags and/or membranes. The films are particularly well suited for production of food and non-food packaging, protecting films, trash bags, blisters, slit film woven bags, composting bags, shopping bags and bubble films.

In addition to susceptibility of PHAs to thermal degradation, low melt strength and slow crystallization rates further complicate film processing methods. Low polymer melt strength creates a need to operate cast film lines at slow line speeds or to use a supporting film or web onto which the PHBV is cast and later isolated as a free-standing film by peeling away the supporting film. Low melt strength makes it extremely difficult to produce blown film without the use of a supporting blown film. Additionally, when producing blown films, residual tack of the PHA can cause the tubular film to stick to itself after it has been cooled and collapsed for winding.

In a further embodiment which overcomes many such limitations, there is provided a process for producing PHA films. Previously, a continuous process for the production of blown and cast free-standing PHA film has been difficult to develop due in part to poor melt strength of the material. The method involves melt processing PHA, preferably in the form of the PHA pellets of this invention, forming the melt into a film, for example by blowing a bubble through a circular die or by casting on cooling rolls through a T shape flat die, and orienting the film by continuous mono- or bi-axial stretching. The Mw of the PHA in the film is greater than 420,000. The Mw of the PHA in the pellets used to produce the film will depend whether PHA thermal stabilizers are present. If none are present, the PHA in the pellets preferably has a molecular weight greater than about 470, 000. If PHA thermal stabilizers are present in accordance with the present invention, the Mw of the PHA in the pellets can be as low as about 435,000 while still being suitable for producing film containing PHA of the desired Mw greater than about 420,000.

The films of the present invention can be formed by a variety of known techniques, such as extrusion processes including calendering, flat die extrusion and film blowing, in addition to casting solutions or suspensions of polymeric compositions followed by solvent recovery.

This method has been found to be particularly useful in producing blown and cast free-standing films having molecular weights greater than 420,000. Many polymer materials used for industrial and agricultural applications are produced from blown and cast film. However, PHA pellets processible into unsupported film by this approach have been neither described nor characterized as having that capability.

In accordance with the present invention, there is provided a stable film blowing process capable of producing unsupported blown PHA films. The molecular weight of the PHA in the pellets is critical in achieving a stable film blowing process in accordance with this method. PHA pellets having molecular weights less than about 470,000, or less than about 435,000 if PHA thermal stabilizers are present, are not suitable for the production of blown films due in part to bubble instability caused by low melt strength.

Film blowing processes are well known in the art (see for example Rosato & Rosato, *Plastics Processing Data Handbook*. Van Nostrand Reinhold (Pub.), NY, 1990) Film blowing typically involves melt extrusion of a tubular preform, cooling the preform, blowing the preform with air such that a stable bubble is formed, collapsing the bubble between nip rolls to produce a film. During blown film processing, the blow up ratio determines the amount of circumferential orientation and the pull rate of the bubble determines longitudinal orientation. With PHA films, mono orientation can be achieved by operating with a puller roll speed to feeder roll speed sufficient to give a draw ratio in the 2–6 range. The cooling rate (air flow), thickness, diameter and height of the bubble are adjusted so that the PHA tubular film is sufficiently crystalline to produce orientation and prevent sticking and blocking, but not too crystalline so as to exhibit undesirable stiffness and brittleness which would prevent the continuous drawing operation.

In orienting film or sheet, a tentering frame may be used which has continuous speed control and diverging tracks with holding clamps. As the clamps move apart at prescribed diverging angles, the hot plastic is stretched in the transverse direction resulting in monodirectional orientation. To obtain bidirectional orientation, an in-line series of heat controlled rolls are located between the extruder and tenter frame. The rotation of each succeeding roller can be increased depending upon the longitudental stretched properties desired.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute examples of preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES 1–6

Compounding Conditions for PHA Pellets of Different Molecular Weights

EXAMPLES 1–3

Betol Laboratory Extruder:

The equipment used in conjunction with these Examples included a Pappenmeier high speed mixer to prepare powder blends, a vibrating feeder allowing powder blends to be fed into the hopper of a 25 mm single screw diameter Betol extruder (L/D=20) fitted with a 4 mm diameter single strand circular die. The extruded strand was cooled and crystallized in a 5 meter long water bath held at 50 to 60° C. using a thermoregulator and then cut into cylindrical pellets with 2–4 mm diameter and 3–6 mm length in a pelletizer.

EXAMPLE 1

PHA pellets were compounded from formulations based on BIOPOL powder (available from Monsanto Company) of Mw=744 k, 1 phr boron nitride (BN) and 10 phr acetyl-tributylcitrate (ATC) plasticizer. BIOPOL powder comprises polyhydroxybutyrate-co-valerate (PHBV) copolymer having 8% valerate. Melt flow index (MFI) values were determined at 170 C. and 5 kg load. The powder blends prepared in a Pappenmeier high speed blender were fed in a Betol single screw, using the conditions summarized in Tables 1 and 2. BIOPOL pellets with Mw's varying from 445 k to 626 k were obtained with output from 1.9 to 3 kg/hr depending on the screw speed used. Mw determinations for all Examples were by GPC using standard monodisperse polystyrene calibrants in a molecular weight range from 5000 to 2,250,000. The following results were obtained:

TABLE 1

Compounding temperatures profiles: (° C.)

| | BARREL | | | DIE |
|---|---|---|---|---|
| | T1 | T2 | T3 | T4 |
| A: | 140 | 150 | 150 | 155 |
| B: | 140 | 150 | 160 | 160 |
| C: | 140 | 160 | 170 | 170 |
| D: | 150 | 170 | 180 | 180 |
| E: | 160 | 180 | 190 | 190 |
| F: | 170 | 190 | 200 | 200 |

TABLE 2

Compounding conditions-from BIOPOL powder Mw = 744k:

| NUCL | TEMP. PROFILE (see Table 1) | SCREW SPEED (rpm) | Mw | Mw/Mn | MFI (g/10 min) | OUTPUT (kg/hr) |
|---|---|---|---|---|---|---|
| BN | C | 40 | 626k | 2.4 | 2.4 | 1.9 |
| BN | D | 60 | 574k | 2.4 | 4.3 | 3.0 |
| BN | E | 40 | 537k | 2.6 | 6.6 | 2.3 |
| BN | F | 40 | 445k | 2.9 | 14.4 | 2.1 |

EXAMPLE 2

PHA pellets were compounded from formulations based on BIOPOL powder of Mw=895 k, 1 phr BN and 10 phr ATC plasticizer. MFI's were determined at 170° C. and 5 kg load. The powder blends prepared in a Pappenmeier high speed blender were fed in a Betol single screw extruder, using the conditions summarized in the Tables 1 and 3. BIOPOL pellets with Mw varying from 625 k to 796 k were obtained with output from 2.9 to 4.7 kg/hr depending on the screw speed used. The following results were obtained:

TABLE 3

Compounding conditions from BIOPOL powder Mw = 895k:

| GRADE | TEMP. PROFILE (see Table 1) | SCREW SPEED (rpm) | Mw | Mw/Mn | MFI (g/10 min) | OUTPUT (kg/hr) |
|---|---|---|---|---|---|---|
| BN | A | 40 | 796k | 2.8 | 2.0 | 2.9 |
| BN | B | 60 | 706k | 2.7 | 2.5 | 4.7 |
| BN | C | 40 | 690k | 2.7 | 2.5 | 2.9 |
| BN | D | 40 | 625k | 2.6 | 3.9 | 3.0 |

EXAMPLE 3

PHA pellets were compounded from formulations based on BIOPOL powder of Mw=895 k, 0.1 phr DZB (cyclohexylphosphonic acid), 0.4 phr ZnSt (zinc stearate) and 10 phr ATC plasticizer. MFI's were determined at 170 C. and 5 kg load. The powder blends prepared in a Pappenmeier high speed blender were fed in a Betol single screw extruder, using the conditions summarized in Tables 1 and 4. BIOPOL pellets with Mw of 727 k were obtained with output from 3.0 kg/hr at a screw speed of 40 rpm. The following results were obtained:

TABLE 4

Compounding conditions from BIOPOL powder Mw = 895k:

| GRADE | TEMP. PROFILE (see Table 1) | SCREW SPEED (rpm) | Mw | Mw/Mn | MFI (g/10 min) | OUTPUT (kg/hr) |
|---|---|---|---|---|---|---|
| DZB/ZnSt | A | 40 | 793k | 2.6 | 2.0 | 2.6 |
| DZB/ZnSt | B | 40 | 727k | 2.5 | 2.0 | 3.0 |
| DZB/ZnSt | D | 40 | 655k | 2.4 | 3.8 | 3.1 |

EXAMPLES 4–6

Farrel Continuous Mixer PHA Compounding

A Farrel CP250 continuous mixer/extruder was used for industrial scale compounding of BIOPOL pellets. Powder blends were obtained by adding the BN nucleant and the plasticizer to the powder contained in a 400 kg capacity blade blender in continuous rotation. The mixing chamber was fitted with a no.7 low shear rotor. The single screw extruder was fitted with a 100 mm screw and a 20 holes die. The strands were cooled in a 5 meters water bath containing water maintained at 55° C. by circulating the water through a thermoregulator. Table 5 summarizes the conditions used to compound different pellets described in Examples 4–6.

TABLE 5

Continuous Mixer PHA Compounding

| Example | 4 | 5 | 6 | 6 |
|---|---|---|---|---|
| MIXER: | | | | |
| Feed rate (kg/hr) | 200 | 200 | 200 | 200 |
| Rotor speed (rpm) | 500 | 400 | 350 | 300 |
| Chamber temp. | 210 | 200 | 190 | 190 |
| Melt temp. | 173 | 164 | 159 | 156 |
| Orifice % open: | 56 | 83 | 83 | 83 |

TABLE 5-continued

Continuous Mixer PHA Compounding

| Example | 4 | 5 | 6 | 6 |
|---|---|---|---|---|
| EXTRUDER: | | | | |
| Screw speed (rpm) | 65 | 60 | 60 | 60 |
| Rear barrel temp. | 140 | 140 | 140 | 140 |
| Forward barrel temp. | 160 | 160 | 160 | 160 |
| Adapter temp. | 190 | 180 | 180 | 180 |
| Die plate temp. | 190 | 180 | 180 | 180 |
| Head pressure (bar) | 71 | 102 | 104 | 112 |
| Melt temp. | 214 | 205 | 200 | 200 |
| PELLETS: | | | | |
| MFI (g/10 min.-170° C./5 kg) | 8 | 6 | 5 | 4.5 |
| Mw | 525k | 556k | 576k | 591k |
| Mn | 242k | 245k | 234k | 219k |
| Mw/Mn | 2.2 | 2.3 | 2.5 | 2.7 |

All temperatures in degrees Celsius

EXAMPLE 4

A blend based on 100 phr BIOPOL powder (Mw=895 k), 1 phr BN and 10 phr ATC plasticizer was fed into the FARREL CP 250 continuous mixer/extruder at a output rate of 200 kg/Hr. The mixer and extruder conditions were as summarized in Table 5. A melt temperature of 214° C. and a head pressure of 71 bar were measured at the head of the extruder. The pellets obtained had a Mw of 525 k and a MFI of 8 g/10 min. (170° C./5 kg).

EXAMPLE 5

A blend based on 100 phr BIOPOL powder (Mw=895 k), 1 phr BN and 10 phr ATC plasticizer was fed into the FARREL CP 250 continuous mixer/extruder at a output rate of 200 kg/hr. The mixer and extruder conditions were as summarized in Table 5. The rotor speed was reduced to 400 rpm compared to Example 1 and the mixer chamber and extruder adapter/die temperatures were reduced by 10° C. A melt temperature of 214° C. and a head pressure of 71 bar were measured at the head of the extruder. The pellets obtained had a Mw of 556 k and a MFI of 6 g/10 min. (170° C./5 kg)

EXAMPLE 6

Blends were compounded as in Example 5, however the rotor speeds were 350 and 300 rpm respectively. The pellets obtained for the blend having a rotor speed of 350 rpm had a Mw of 576 k and an MFI of 5 g/10 min while the pellets obtained with a rotor speed of 300 rpm had a Mw of 591 k and an MFI of 4.5 g/10 min. (170° C./5 kg).

EXAMPLES 7–12

Effect of Molecular Weight on the Processing and Drawing of Biopol Films

EXAMPLE 7

In this example, the PHA in the pellet was a PHBV copolymer of molecular weight Mw=390 k, containing 8 mol % HV, 1 phr of Boron Nitride (BN) nucleant and 10 phr of Acetyltributylcitrate (ATC) plasticizer. The plasticized PHA pellets were extruded through a 20 mm single screw extruder fitted with a 25 mm circular die using a temperature profile from 155 to 170° C. and a screw speed of 20 rpm. The extruded tubular preform, which was cooled and blown with air to a 12 mm diameter bubble, showed instability, preventing bubble blowing to a larger diameter. The tubular film, collapsed between nip rolls, could not be drawn above a draw ratio of 3 without breaking.

EXAMPLE 8

In this example, the PHA in the pellet was a PHBV copolymer of molecular weight Mw=456 k, containing 8 mol % HV, 1 phr of BN nucleant and 10 phr of ATC plasticizer. The plasticized PHA pellets were extruded through a 20 mm single screw extruder fitted with a 25 mm circular die using a temperature profile from 155 to 170° C. and a screw speed of 20 rpm. The extruded tubular preform, which was cooled and blown with air to a 25 mm diameter bubble, showed instability, preventing bubble blowing to a larger diameter. The tubular film, collapsed between nip rolls, could not be drawn above a draw ratio of 5.4 without breaking. At a draw ratio of 5.4, the orientation process was discontinuous.

EXAMPLE 9

In this example, the PHA in the pellet was a PHBV copolymer of molecular weight Mw=525 k, containing 8 mol % HV, 1 phr of BN nucleant and 10 phr of ATC plasticizer. The plasticized PHA pellets were extruded through a 20 mm single screw extruder fitted with a 25 mm circular die using a temperature profile from 155 to 165° C. At a screw speed of 26 rpm, the extruded tubular preform, which was cooled and blown with air to a 25 mm diameter bubble, produced after collapsing between two nip rolls a film with a thickness of 90–110 microns, characterized by a tensile strength at break of 27 Mpa and an elongation at break of 8–12%. The collapsed tubular film could be stretched in the machine direction in a continuous process up to a drawing ratio of about 5.8. 35–40 micron thick oriented film was obtained which was characterized by a tensile strength at break of 85 Mpa and an elongation at break of 80–100%.

EXAMPLE 10

In this example, the PHA in the pellet was a PHBV copolymer of molecular weight Mw=625 k, containing 8 mol % HV, 1 phr of BN nucleant and 10 phr of ATC plasticizer. The plasticized PHA pellets were extruded through a 20 mm single screw extruder fitted with a 25 mm circular die using a temperature profile from 160 to 180° C. At a screw speed of 25 rpm, the extruded tubular preform, which was cooled and blown with air to a stable 25 mm diameter bubble, produced after collapsing between two nip rolls a film with a thickness of 110–140 microns, characterized by a tensile strength at break of 27 Mpa and an elongation at break of 13–17%. The collapsed tubular film could be stretched in the machine direction up to a drawing ratio of 5.8 in a continuous process. 50 micron thick oriented film was obtained which was characterized by a tensile strength at break of 101–138 Mpa and an elongation at break of 75–85%.

EXAMPLE 11

In this example, the PHA in the pellet was a PHBV copolymer of molecular weight Mw=700 k, containing 8 mol % HV, 1 phr BN nucleant system and 10 phr of ATC plasticizer. The plasticized PHA pellets were extruded through a 20 mm single screw extruder fitted with a 25 mm circular die using a temperature profile from 160 to 180° C. At a screw speed of 20 rpm, the stiff extruded tubular preform could not be blown above a stable 20 mm diameter bubble, which produced after collapsing between two nip rolls a film with a thickness of 180–240 microns, characterized by a tensile strength at break of 27 Mpa and an elongation at break of 14–30%. The collapsed tubular film could be stretched in the machine direction up to a drawing ratio of 6 in a continuous process. 50 micron thick oriented film was obtained which was characterized by a tensile strength at break of 120 Mpa and an elongation at break of 70–80%.

EXAMPLE 12

In this example, the PHA in the pellet was a PHBV copolymer of molecular weight Mw=796 k, containing 8 mol % HV, 1 phr BN nucleant system and 10 phr of ATC plasticizer. The plasticized PHA pellets were extruded through a 20 mm single screw extruder fitted with a 25 mm circular die using a temperature profile from 165 to 185° C. At a screw speed of 20 rpm, the stiff extruded tubular preform could not be blown above a stable 18 mm diameter bubble, which produced after collapsing between two nip rolls a film with a thickness of 160–200 microns, characterized by a tensile strength at break of 27 Mpa and an elongation at break of 17–45%. The collapsed tubular film could be stretched in the machine direction up to a drawing ratio of 5.8 in a continuous process. 60 micron thick oriented film was obtained which was characterized by a tensile strength at break of 136 Mpa and an elongation at break of 80–95%.

The results of Examples 7–12 are summarized in Table 6 below.

TABLE 6

Effect of Molecular Weight on the Processing and Drawability of PHA films

| Ex. | MW | % Elongation at break oriented/unoriented | Tensile Strength at break, MPa oriented/unoriented |
| --- | --- | --- | --- |
| 7 | 390k | Unstable bubble - No continuous orientation | |
| 8 | 456k | Unstable bubble - No continuous orientation | |
| 9 | 525k | 80–100/8–12 | 85/27 |
| 10 | 625k | 75–85/13–17 | 101–138/27 |
| 11 | 700k | 70–80/14–30 | 120/27 |
| 12 | 796k | 80–95/17–45 | 136/27 |

All formulations contained 1 phr boron nitride (BN) nucleant and 10 phr acetyltributylcitrate (ATC) plasticizer Thus, Examples 7–12 demonstrate that it is necessary to use PHA pellets having a sufficiently high Mw in order to achieve a stable process by which unsupported film can be blown and oriented.

EXAMPLES 13–16

Effect of Plasticizer Level and Nucleant System on the Processing and Drawability of Biopol Films

EXAMPLE 13

In this example, the PHA in the pellet was a PHBV copolymer of molecular weight Mw=500 k, containing 8 mole % HV and 1 phr of BN nucleant. The unplasticized PHA pellets, compounded first by extrusion of PHBV powder blend with the additives, were extruded through a 20 mm single screw extruder fitted with a 25 mm circular die using a temperature profile from 165 to 175° C. and a screw speed of 16 rpm. The extruded tubular preform, which was cooled and blown with air to a 12 mm diameter stiff bubble, showed instability, preventing bubble blowing to a larger diameter. The tubular film, collapsed between nip rolls, had a thickness of 80 microns, an elongation at break of 6% and a tensile strength of 22%. This film could not be drawn above a draw ratio of about 3 without breaking. The oriented film obtained in a discontinuous process had a thickness of 35 microns, an elongation at break of 65% and a tensile strength at break of 62 MPa.

EXAMPLE 14

In this example, the PHA in the pellet was a PHBV copolymer of molecular weight Mw=500 k, containing 8 mole % HV, 1 phr of BN nucleant and 3 phr ATC plasticizer. The plasticized PHA pellets, compounded first by extrusion of PHBV powder blend with the additives, were extruded through a 20 mm single screw extruder fitted with a 25 mm circular die using a temperature profile from 155 to 170° C. and a screw speed of 20 rpm. The extruded tubular preform was cooled and blown with air to a 25 mm diameter stiff bubble. The tubular film collapsed between nip rolls had a thickness of 80 microns, an elongation at break of 6% and a tensile strength of 22%. This film could not be drawn above a draw ratio of 3 without breaking. The oriented film obtained in a discontinuous process had a thickness of 35 microns, an elongation at break of 66% and a tensile strength at break of 61 Mpa.

EXAMPLE 15

In this example, the PHA in the pellet was a PHBV copolymer of molecular weight Mw=500 k, containing 8 mole % HV, 1 phr of BN nucleant and 6 phr ATC plasticizer. The plasticized PHA pellets, compounded first by extrusion of PHBV powder blend with the additives, were extruded through a 20 mm single screw extruder fitted with a 25 mm circular die using a temperature profile from 155 to 165° C. and a screw speed of 25 rpm. The extruded tubular preform was cooled and blown with air to a 35 mm diameter bubble. The tubular film, collapsed between nip rolls, had a thickness of 100 microns, an elongation at break of 9% and a tensile strength of 23%. This film could not be drawn above a draw ratio of 3 without breaking. The oriented film obtained in a discontinuous process had a thickness of 50 microns, an elongation at break of 72% and a tensile strength at break of 58 MPa.

EXAMPLE 16

In this example, the PHA in the pellet was a PHBV copolymer of molecular weight Mw=525 k and Mn=242 k, containing 8 mole % HV, 1 phr of BN nucleant and 10 phr of ATC plasticizer. The plasticized PHA pellets were extruded through a 20 mm single screw extruder fitted with a 25 mm circular die using a temperature profile from 155 to 165° C. At a screw speed of 26 rpm, the extruded tubular preform, which was cooled and blown with air to a stable 30 mm diameter bubble produced after collapsing between two nip rolls a film with a thickness of 110 microns, characterized by a tensile strength at break of 17 Mpa and an elongation at break of 8%. The collapsed tubular film could be stretched in the machine direction in a continuous process with a drawing ratio of about 5. The 35 micron thick oriented film obtained was characterized by a tensile strength at break of 85 Mpa and an elongation at break of 80%. The PHBV in the film was found to have Mw=451 k and Mn=211 k which corresponds to a loss in Mw of 14% and a loss in Mn of 12.7%.

The results of Examples 13–16 are summarized in the following Table:

TABLE 7

| Ex. | MW | ATC level phr | % Elongation at break oriented/unoriented | Tensile Strength at break, MPa oriented/unoriented |
|---|---|---|---|---|
| 13 | 500k | 0 | 65/6 | 62/22 |
| 14 | 500k | 3 | 66/6 | 61/22 |
| 15 | 500k | 6 | 72/9 | 58/23 |
| 16 | 500k | 10 | 80/8 | 85/17 |

All formulations contained 1 phr BN nucleant

EXAMPLE 17

In this example, the PHA in the pellet was a PHBV copolymer of molecular weight Mw=508 k and Mn=215 k, containing 8 mol % HV, 0.1 phr Cyclohexylphosphonic acid (DZB)/0.4 phr Zinc Stearate (ZnSt) nucleant system and 10 phr of ATC plasticizer. The plasticized PHA pellets were extruded through a 20 mm single screw extruder fitted with a 25 mm circular die using a temperature profile from 155 to 165° C. At a screw speed of 13 rpm, the extruded tubular preform, which was cooled and blown with air to a stable 25 mm diameter bubble produced after collapsing between two nip rolls a stiff semi-transparent film with a thickness of 90 microns, characterized by a tensile strength at break of 20 Mpa and an elongation at break of 13%. The collapsed tubular film could be stretched in the machine direction up to a drawing ratio of about 6 in a continuous process. The 40 micron thick clear oriented film obtained was characterized by a tensile strength at break of 90 Mpa and an elongation at break of 75%. The PHBV in the film was found to have Mw=493 k and Mn=211 k corresponding to a loss in Mw of 2.9% and a loss in Mn of 1.9%.

TABLE 8

| Ex | MW (pellet) | Nucleant | % Elongation at break (oriented/unoriented) | Tensile Strength at break, MPa (oriented/unoriented) |
|---|---|---|---|---|
| 16 | 525k | RN | 80/8 | 58/17 |
| 17 | 508k | DZB/ZnSt | 75/13 | 90/20 |

EXAMPLES 18–21

Thermostabilization of PHA

Based upon the results of Example 17 where in the presence of DZB/ZnSt very little PHA Mw loss was observed in the film when compared to the Mw of the pellets used to produce the film, the following experiments were carried out:

EXAMPLE 18

PHBV pellets compounded from formulations based on BIOPOL powder of Mw=895 k, 10 phr ATC plasticizer and respectively 1 phr BN or a combination of 0.1 phr cyclohexyl phosphonic acid (DZB) and 0.4 phr zinc stearate (ZnSt). The two powder blends prepared in a Pappenmeier high speed blender were fed in a 25 mm Betol single screw extruder (L/D=20) fitted with a 4 mm diameter single strand circular die using barrel temperature profile of 140 to 160° C. and a screw speed of 60 rpm. The extruded strand was cooled and crystallized in a 5 meter long water bath held at 50–60° C. using a thermoregulator and then cut into cylindrical pellets with a 3–4 mm diameter and 3–5 mm length in a pelletizer. The PHA in the pellets containing either BN or DZB/ZnSt had Mw=706 k and 757 k respectively.

EXAMPLE 19

PHBV pellets compounded from formulations based on BIOPOL powder of Mw=895 k, 10 phr ATC plasticizer and respectively 1 phr BN or a combination of 0.1 phr cyclohexyl phosphonic acid (DZB) and 0.4 phr zinc stearate (ZnSt). The two powder blends prepared in a Pappenmeier high speed blender were fed in a 25 mm Betol single screw extruder (L/D=20) fitted with a 4 mm diameter single strand circular die using barrel temperature profile of 150 to 180° C. and a screw speed of 40 rpm. The extruded strand was cooled and crystallized in a 5 meter long water bath held at 50–60° C. using a thermoregulator and then cut into cylindrical pellets with a 3–4 mm diameter and 3–5 mm length in a pelletizer. The PHA in the pellets containing either BN or DZB/ZnSt had Mw=625 k and 655 k respectively.

EXAMPLE 20

PHBV pellets compounded from formulations based on BIOPOL powder of Mw=679 k, 10 phr ATC plasticizer and respectively 1 phr BN or a combination of 0.1 phr cyclohexyl phosphonic acid (DZB) and 0.4 phr zinc stearate (ZnSt). The two powder blends prepared in a Pappenmeier high speed blender were fed in a 25 mm Betol single screw extruder (L/D=20) fitted with a 4 mm diameter single strand circular die using barrel temperature profile of 140 to 170° C. and a screw speed of 40 rpm. The extruded strand was cooled and crystallized in a 5 meter long water bath held at 50–60° C. using a thermoregulator and then cut into cylindrical pellets with a 3–4 mm diameter and 3–5 mm length in a pelletizer. The PHA in the pellets containing either BN or DZB/ZnSt had Mw=571 k and 618 k respectively.

The results of Examples 18–20 are summarized in Table 9 below and demonstrate that DZB/ZnSt can serve as a thermal stabilizer during pellet production.

TABLE 9

| Nucleant System | Mw of PHVB Powder | Mw of PHBV Pellets | % Reduction |
|---|---|---|---|
| BN | 895k | 706k | 21.1 |
| DZB/ZnSt | 895k | 757k | 15.4 |
| BN | 895k | 625k | 30.2 |
| DZB/ZnSt | 895k | 655k | 26.8 |
| BN | 679k | 571k | 15.9 |
| DZB/ZnSt | 679k | 618k | 9.0 |

EXAMPLE 21

PHBV films were obtained by extrusion blowing using a 20 mm Brabender single screw extruder (L/D=20) fitted with a 25 mm circular die of the spider type and with a Brabender single screw force feeder to handle powders, using a barrel temperature profile of 155–165° C. and a screw speed of 25 rpm. PHA pellets were based on PHBV copolymers of Mw=525 k and 508 k containing 10 phr ATC plasticizer and respectively 1 phr BN nucleant or 0.1 phr DZB/0.4 phr ZnSt. The films obtained by blowing a bubble of 25 mm diameter and collapsing it between two nip rolls had a thickness after separation of the two layers of about 110 microns and had MW=451 k and 493 k respectively. The results are summarized in Table 10 below, demonstrating that the presence of DZB/ZnSt in PHA pellets can serve as a thermal stabilizer during film extrusion/production.

TABLE 10

| Nucleant System | Mw of PHVB in Pellets | Mw of PHBV in Film | % Reduction |
|---|---|---|---|
| BN | 525k | 451k | 14.1 |
| DZB/ZnSt | 508k | 493k | 3.0 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A blown or cast free-standing film comprising a polyhydroxyalkanoate (PHA), wherein the PHA has a Mw greater than 420,000 and wherein the film is made from a pellet composition comprising the PHA and a thermal stabilizer, wherein the draw ratio of the film is from about 2 to about 7.

2. The film of claim 1, wherein the film is a blown film.

3. The film of claim 2, wherein the film has a percent elongation at break greater than 65%.

4. The film of claim 2, wherein the film has a percent elongation at break greater than 75%.

5. The film of claim 2, wherein the film has a tensile strength at break greater than 50 Mpa.

6. The film of claim 2, wherein the tensile strength at break is greater than 75 Mpa.

7. A method of producing a blown or cast free-standing film, comprising, inciting a pellet composition comprising a PHA and a thermal stabilizer, wherein the PHA in the film has a molecular weight greater than 420,000, and wherein the film has a draw ratio of from about 2 to about 7.

8. The method of claim 7 wherein the thermal stabilizer is an organophosphorous compound having the structural formula:

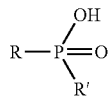

where R' is R or OH, and R is a branched or uubranehed saturated C1–C30 group, a branched or unbranched unsaturated C2–C30 group, C6–C30 aromatic group, or a saturated or unsaturated C6–C30 cycloaliphatic group.

9. The method of claim 7, wherein the film is produced by a continuous process.

10. The method of claim 7, wherein the melt is formed into a film by film blowing.

11. The method of claim 7, wherein the PHA in the pellet has a Mw greater than 470,000, and wherein the PHA in the film has a Mw greater than 420,000 Daltons.

12. The method of claim 8, wherein the organophosphorous compound further contains one or more O, N, or S atoms in the alkyl chains.

13. The method of claim 8 wherein the organophosphorous compound is substituted with one or more hydroxyl, halo, carboxylic acid or ester, cyano, aryl, amino, hydroxylamino, mono-, di-, or trialkyl amino, or phosphonic acid groups.

14. The method of claim 8, wherein the organophosphorous compound is selected from the roup consisting of cyclohexylphosphonic acid, 1-cyclohexenylphosphonic acid, 1-hydroxycyclohexenylphosphonic acid, 1-hexanephosphonic acid, 1-hydroxyethylidene-1,1-diphosphonic acid, dicyclohexylphosponic acid, and 2,4,4-(trimethylpentyl)cyclohexylphospbonic acid.

15. The method of claim 7 wherein the pellet composition further comprises an oxide, hydroxide, or carboxylic acid salt of a metal from Groups I to V of the Periodic Table.

16. The method of claim 7, wherein the pellet composition further comprises calcium stearate, magnesium stearate, zinc stearate, or zinc oxide.

17. The method of claim 8, wherein the organophosphorous compound is a diphosphonic acid.

18. The method of claim 17, wherein the diphosphonic acid is hydroxyethylidene-1,1-diphosphonic acid.

19. The method or claim 7 wherein the pellet composition further comprises a fatty acid salt of a metal from Groups I to V of the Periodic table.

20. The method of claim 7 wherein the pellet composition further comprises a weak organic base selected from fatty acid amides.

21. The blow or cast free-standing film of claim 1 wherein the pellet composition further comprises a material selected from the group consisting of boron nitride and acetybutylcitrate.

22. The method of claim 8 wherein the pellet composition further comprises a material selected from the group consisting of boron nitride and acetylbutylcitrate.

23. The film of claim 1, wherein the thermal stabilizer is an organophosphorous compound having the structural formula:

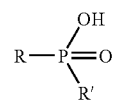

where R' is R or OH, and R, is a branched or unbranched saturated C1–C30 group, a branched or unbranched unsaturated C2–C30 group, a C6–C30 aromatic group, or a saturated or unsaturated C6–C30 cycloaliphatic group.

24. The film of claim 23, wherein the organophosphorous compound further contains one or more O, N, or S atoms in the alkyl chains.

25. The film of claim 23, wherein the organophosphorous compound is substituted with one or more hydroxyl, halo, carboxylic acid or ester, cyano, aryl, amino, hydroxylamino, mono-, di-, or trialkyl amino, or phosphonic acid groups.

26. The film of claim 7, wherein the organophosphorous compound is selected from the group consisting of cyclohexylphosphonic acid, 1-cyclohexenylphosphonic acid, 1-hydroxycyclohexenylphosphonic acid, 1 hexanephosphonic acid, 1-hydroxyethylidene-1,1-diphosphonic acid, dicyclohexylphosponic acid, and 2,4,4-(trimethylpentyl)cyclohexylphosphonic acid.

27. The film of claim 1, wherein the pellet composition further comprises an oxide, hydroxide, or carboxylic acid salt of a metal from Groups I to V of the Periodic Table.

28. The film of claim 1, wherein the pellet composition further comprises calcium stearate, magnesium stearate, zinc stearate, or zinc oxide.

29. The film of claim 1 wheretn the film is oriented uniaxially.

30. The film of claim 1 wherein the film is oriented biaxially.

* * * * *

UNITED STATES PATENT AND TRADEMARK OFFICE
CERTIFICATE OF CORRECTION

PATENT NO.       : 7,208,535 B2
APPLICATION NO.  : 10/635316
DATED            : April 24, 2007
INVENTOR(S)      : Jawed Asrar and Jean R. Pierre It is certified that error appears in the above-identified patent and that said Letters Patent is hereby corrected as shown below:

Claim 7, column 22, line 64, replace "inciting" with --melting--.
Claim 8, column 23, line 11, replace "uubranehed" with --unbranched--.
Claim 8, column 23, line 13, insert --a-- before "C6-C30 aromatic group".
Claim 14, column 23, lines 36 and 37, replace "2,4,4-(trimethylpentyl)cyclohexylphospbonic acid" with --2,4,4-(trimethylpentyl)cyclohexylphosphonic acid--.
Claim 21, column 24, lines 6 and 7, replace "acetybutycitrate" with --acetylbutylcitrate--.
Claim 23, column 24, line 21, replace "and R, is a" with --and R is a--.
Claim 29, column 24, line 46, replace "wheretn" with --wherein--.

Signed and Sealed this

Twenty-first Day of August, 2007

JON W. DUDAS
*Director of the United States Patent and Trademark Office*